Patented Mar. 30, 1954

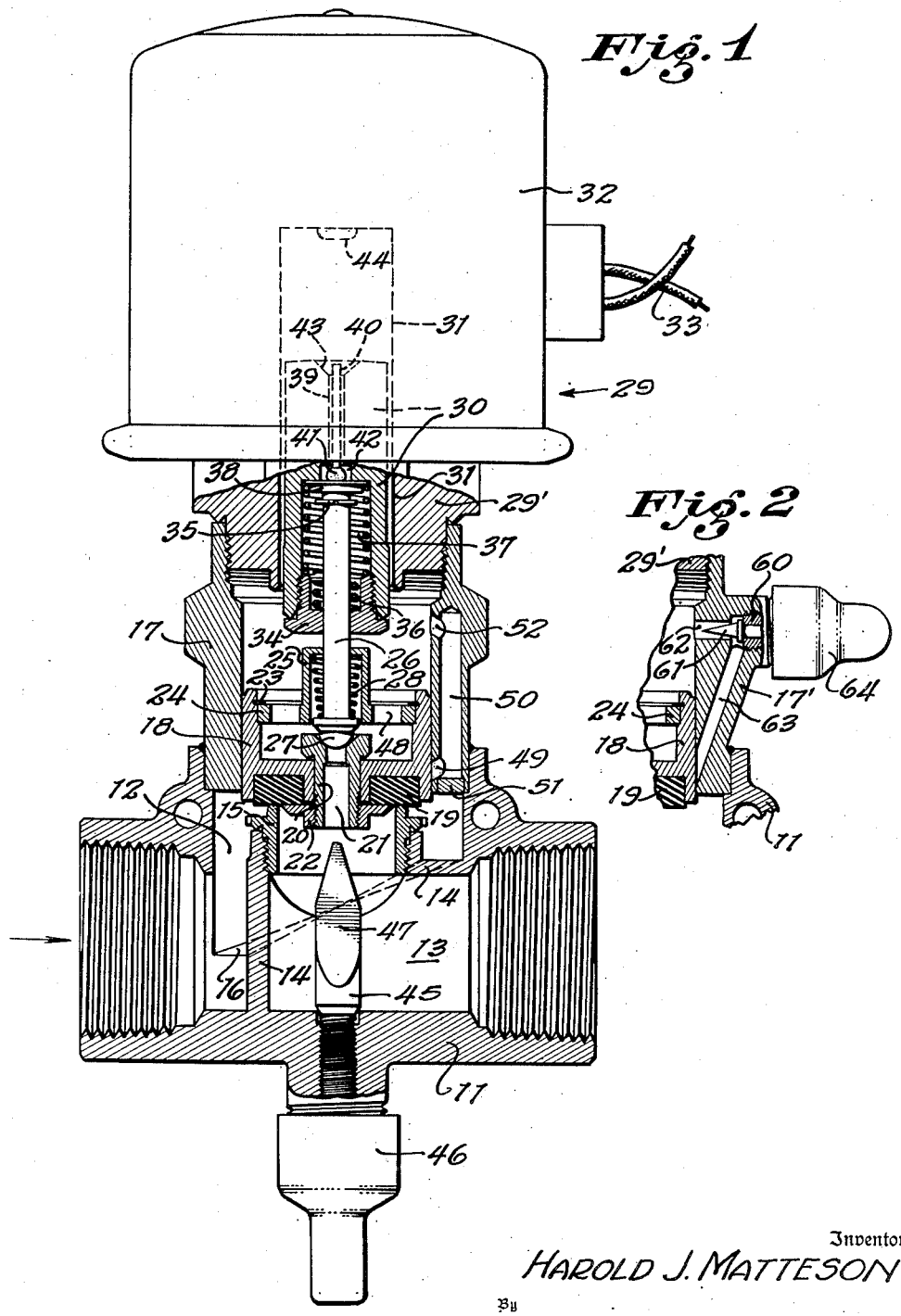

2,673,706

UNITED STATES PATENT OFFICE 2,673,706

PILOT CONTROLLED MAIN VALVE WITH CUSHIONING MEANS

Harold J. Matteson, Glendale, Calif., assignor to General Controls Co., Glendale, Calif., a corporation of California Application July 28, 1950, Serial No. 176,349

1 Claim. (Cl. 251—30)

My present invention relates to pilot-controlled piston-operated valves of the type wherein the piston is continuously subjected to the pressure of the fluid in the inlet chamber of the valve, and is movable inwardly of its cylinder when the same is vented. In the outward movement of the piston, when the vent is closed by the pilot valve, the fluid normally passes to the cylinder through the clearance space between the piston and the cylinder. When such a valve is employed for controlling flow of liquids, it is customary to slot the piston lengthwise (providing, in effect, greater piston-clearance) to permit sufficiently rapid outward movement of the piston. However, because of the more rapid outward movement of the piston "water hammer" usually results at the end of the stroke; and, due to the slot, there is substantial loss of the pressure for operating the piston inwardly.

It is an object of this invention to provide a valve of the general character described, and suitable for the control of liquids, which is free from the aforementioned disadvantages; this object being accomplished by the provision of a passage interconnecting the opposite ends of the piston-cylinder and closed by the piston when the same is in its outer position.

For full understanding of the invention, and further appreciation of its features and advantages, reference is to be had to the following detailed description and accompanying drawing, and to the appended claim.

In the drawing:

Figure 1 is a sectional view of a piloted piston valve embodying the invention; and Figure 2 is a fragmentary section of the valve of Fig. 1 showing a modified arrangement of the passage interconnecting the ends of the cylinder.

Referring first more particularly to Fig. 1, the numeral 11 indicates a valve casing having an inlet chamber 12 and an outlet chamber 13 separated by a generally right-angled partition 14. Through the horizontal part of this partition is a port wherein a tubular valve-seat member 15 is threaded. The bottom surface of the inlet chamber inclines upward, as indicated at 16, to facilitate flow to the port.

Fitting tightly in an opening at the top of the casing, and secured to the casing as by solder or by brazing, is a hollow cylinder 17 containing a piston 18. In a recess in the underside of the piston is an annular closure 19, of material such as rubber, which cooperates with the seat member 15. The piston 18 has an opening through its bottom wall, and in this opening is a headed fitting 20 whose bore 21 defines a vent for the cylinder space inward of the piston; a flanged nut 22, threaded on the lower end of the fitting, serving to secure both the fitting and closure 19 in place.

Resting on a shoulder in the hollow upper part of piston 18, and secured in place by a snap-ring 23, is a disk 24 having on its top a concentric hollow boss 25. This boss has an opening through its top wall for guidingly receiving a stem 26 having at its bottom a closure 27 cooperable with the tapered mouth of vent 21 and urged thereagainst by the force of a compression spring 28 encircling the stem within the hollow of boss 25.

Threaded in the open upper end of cylinder 17, and generally indicated by the numeral 29, is a solenoid actuator for the vent-closure 27. This actuator comprises a plunger 30 which is reciprocable in a tube 31 secured in the base portion 29' of the actuator and extending within a housing 32; the tube being surrounded within the housing by an energizing coil (not shown) having external leads 33. The lower part of plunger 30 is hollow and is closed at its bottom by a threaded plug 34 having an opening through which the vent-closure stem 26 freely extends. Stem 26 carries adjacent its top a snap-ring 35 which, when the solenoid is energized and the plunger consequently attracted upward, is engaged by a stiff shock-absorbing spring 36 in the hollow of plug 34; the distance between ring 35 and spring 36 being such that no movement of stem 26 occurs until after the plunger has passed through a major part of its upward stroke. In the hollow lower part of the plunger is a spring 37 which is compressed between plug 34 and the flange of a disk 38 at the top of the hollow; the plunger, through disk 38, resting by gravity on the top of stem 26 when the solenoid is unenergized.

Through the upper part of plunger 30 is a vertical opening 39 for a rod 40 which is enlarged at its bottom as indicated at 41; a cavity 42 being provided at the bottom of opening 39 for the enlargement 41. Rod 40 rests by gravity on the disk 38. At the top of opening 39 is a conical recess 43 which cooperates with a stop-button 44 on the top wall of plunger-tube 31 to center the upper end of the plunger when the same is attracted upward upon energization of the solenoid. When the plunger is in attracted position, due to engagement of the tip of rod 40 with the underside of button 44 the disk 38 is moved slightly downward against the force of spring 37 (stem 26 then being out of engagement with disk 38) so that the force of this spring is then effective to initiate downward movement of the plunger when the solenoid is subsequently deenergized.

For opening the valve manually, if necessary, there is a screw 45 threaded in an opening through the bottom wall of casing 11 and covered by a sealing cap 46. The tapered inner portion of this screw has a flat surface 47 to avoid obstruction of vent 21 when the piston is raised by the screw.

With the parts in the positions shown in Fig. 1, and the inlet chamber 12 connected to a source of fluid under pressure, the valve remains closed due to leakage of the fluid past the piston to the otherwise-closed space above it (the pilot valve constituted by closure 27 and vent fitting 20 being closed) so that the pressure of the fluid is applied to the top of the piston whose area is larger than the area of the bottom of the piston subjected to the pressure; and also because of the gravity bias of the piston and the parts carried thereby.

When the solenoid is energized the plunger 30 is instantly attracted to its final position in engagement with stop-button 44. In that movement of the plunger the stem 26 is picked-up, when its ring 35 is engaged by spring 36, and brought to a position wherein the vent closure 27 is raised, against the force of spring 28, through a considerable distance out of engagement with vent fitting 20, so that fluid compressed above the piston escapes freely to the outlet 13 through vent 21; the fluid passing through openings 48 in disk 24. The pressure of the fluid in the inlet chamber 12 below the piston, aided by the force applied to the piston by the plunger through stem 26 and spring 28, is then effective to raise the piston. It is to be observed that the length and arrangement of spring 28 are such that even if, due to some defect, the piston fails to rise, the plunger can still reach its final position; overheating of the solenoid, which would occur if the plunger failed to complete its stroke, is thus avoided.

As the piston rises it uncovers an opening 49 in the side surface of cylinder 17, which opening branches from a vertical passage 50 drilled in the side wall of the cylinder and closed at its bottom by a plug 51; there being a similar branch opening 52 near the top of the passage. The passage 50 is preferably at the side of the piston away from the inlet of the valve, as shown. In its normal raised position the piston is approximately midway between the openings 49 and 52, the spring 28 then being compressed to about three-quarters of its former length under the weight of the piston.

If in the initial upward movement of the piston its velocity is such that it rises considerably above its normal position, the vent closure 27 seats and opening 52 is closed by the upper part of the piston, so that the space above the piston is then sealed and farther upward movement of the piston cushioned; the piston thereafter falling to its normal raised position.

When the solenoid is deenergized its plunger 30 is released and falls into engagement with stem 26 which has moved to vent-closing position under the force of spring 28. Vent 21 being closed, the fluid pressures above and below the piston are equalized by way of passage 50, and the piston falls by gravity. Due to the large flow capacity of passage 50 and its openings 49 and 52, the initial downward movement of the piston is rapid. But when opening 49 is obstructed by the piston, descent of the piston is checked because of the resultant reduction of pressure above it; the final movement of the piston being relatively slow as fluid leaks past it into the cylinder above.

It is thus apparent that, due to the by-pass 49, 50, 52 controlled by the piston (acting as a slide valve) substantially the full amount of inlet pressure is effective for raising the piston; and, while rapid descent of the piston is permitted through a substantial part of its stroke, there is little possibility of jar, or water-hammer when the controlled fluid is a liquid, as the piston seats. On account of the by-pass the piston clearance may be made very small to increase the effective operating pressure.

In Fig. 2 a modified form of by-pass is shown whereby the closing speed of the valve can be adjusted. The right wall of the cylinder, indicated in this figure by the numeral 17', is provided with a boss which is drilled and threaded for a screw 60 which carries a needle valve 61 controlling communication between passages 62 and 63 leading respectively to the upper and lower ends of the cylinder; the outer end of screw 60 being covered by a sealing cap 64. It is apparent that the passages 62—63 serve the same purpose as passage 50 and openings 49, 52 in the arrangement of Fig. 1, and that by inward adjustment of the needle valve downward movement of the piston can be retarded.

The specific embodiments of my invention herein shown and described are obviously susceptible of modification without departing from the spirit of the invention, and I intend therefore to be limited only by the scope of the appended claim.

I claim as my invention:

In a pressure operated valve: a casing having an inlet chamber and an outlet chamber separated by a partition having a valve port therethrough; means closing an opening through the casing wall of said inlet chamber and defining a piston-cylinder generally coaxial with said valve port and opening into the inlet chamber; a piston reciprocable in said cylinder between an outer and an inner position with respect thereto, said piston being biased outward of the cylinder and carrying a closure for controlling flow through said valve port; said piston having therethrough a concentric vent interconnecting said valve port and the space in the cylinder inward of the piston, said vent having a valve seat at its inner end; a pilot valve comprising a closure, in said cylinder space, movable along the axis of the piston into and out of engagement with said vent seat; means mounted on said cylinder for actuating said vent closure; said piston being movable inward of the cylinder under the pressure of fluid in said inlet chamber when said vent is opened, and to its outer position under the force of said bias when the vent is closed; the fit of said piston in the cylinder being relatively close and uniform throughout the range of movement of the piston; means interconnecting said vent closure and said piston whereby the piston is retained in a normal inward position when the vent closure is out of engagement with its seat; means forming a passage for freely interconnecting opposite ends of said cylinder, one end of said passage adjacent the inlet-chamber end of the cylinder being so located that it is closed by said piston when the same is in and adjacent its outer position, the opposite end of said passage being so located that it is closed by said piston if, in its initial inward movement, the piston should reach an extreme position beyond said normal inward position; said vent closure being so arranged that it is engaged by its seat when the piston is in said extreme position; and means permitting constant leakage of fluid between the opposite ends of said cylinder but at a rate only sufficient to permit movement of the piston to its final outer position when said vent and said one end of said passage are closed.

HAROLD J. MATTESON.

References Cited in the file of this patent

UNITED STATES PATENTS

| Number | Name | Date |
|---|---|---|
| 700,486 | Finney | May 20, 1902 |
| 1,223,584 | Huebsch | Apr. 24, 1917 |
| 1,804,137 | Yates | May 5, 1931 |
| 1,807,191 | Boyle | May 26, 1931 |
| 1,989,341 | Shenton | Jan. 29, 1935 |
| 2,197,320 | Shenton | Apr. 16, 1940 |
| 2,355,164 | Jaseph | Aug. 8, 1944 |

FOREIGN PATENTS

| Number | Country | Date |
|---|---|---|
| 452,902 | Germany | of 1927 |